Oct. 31, 1944.  N. E. DICKINSON  2,361,462
POSITION INDICATOR
Filed June 13, 1942

INVENTOR
NORMAN E. DICKINSON.
BY
Harris G. Luther
ATTORNEY.

Patented Oct. 31, 1944

2,361,462

UNITED STATES PATENT OFFICE 2,361,462

POSITION INDICATOR

Norman E. Dickinson, Windsor, Conn.

Application June 13, 1942, Serial No. 446,963

6 Claims. (Cl. 177—311)

This invention relates to improvements in instruments for indicating the position of movable machine elements and has particular reference to an improved instrument for indicating the top dead center position of a movable element such as an engine piston.

An object of the invention resides in the provision of an instrument of the character indicated which will provide a visible indication of the piston position as the piston approaches a dead center position.

Another object is to provide an instrument adapted for determining the positions of machine elements invisible to the operator.

A further object resides in the provision of self-contained light weight instrument particularly adapted for aircraft engines.

Other objects and advantages will be more particularly pointed out hereinafter or will become apparent as the description proceeds.

In the accompanying drawing, in which like reference numerals are utilized to designate similar parts throughout, there is illustrated a suitable mechanical embodiment for the purpose of illustration only and is not to be taken as limiting or restricting the invention since it will be apparent to those skilled in the art that various changes in the illustrated embodiment may be resorted to without in any way exceeding the scope of the invention.

In assembling and timing engines, after the crankshaft, piston and connecting rods have been assembled with the engine crankcase and cylinders, it is possible to determine the rotary position of the crankshaft by determining the dead center position of one of the engine pistons and, once the crankshaft position has been definitely determined, it is relatively simple to assemble and adjust the various engine members to function at the proper angular position of the crankshaft.

Considerable difficulty and inconvenience has been encountered heretofore in accurately determining the top dead center position of a piston in an engine cylinder and it is among the objects of this invention to provide a suitable device for accurately and conveniently accomplishing this result.

Figure 1:
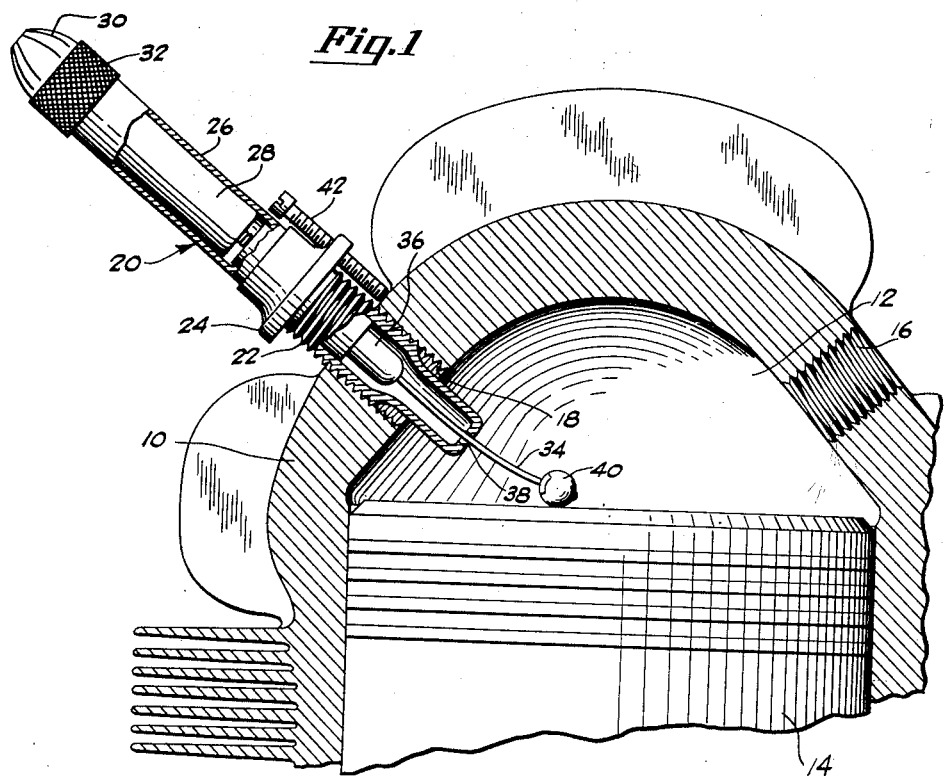
Fig. 1 is a cross-sectional view of a fragmentary portion of an engine cylinder showing a piston therein and the piston position-indicating instrument in position therein portions of the instrument being broken away and shown in section to better illustrate the construction thereof.

Referring to the drawing in detail and particularly to Fig. 1, the numeral 10 generally indicates an engine cylinder including a combustion chamber 12 above the piston 14 and having a pair of spark plug apertures 16 and 18 tapped into the combustion chamber.

The top center indicator, generally indicated at 20, has an externally threaded hollow base portion 22 screwed into a spark plug aperture. Mounted on the base member 22 above flange 24 is a hollow casing 26 containing a flash light cell 28 connected with a bulb enclosed in a transparent globe or housing 30 secured to the casing by threaded collar 32, this casing, cell and light bulb constituting a flashlight the components of which may be conventional articles of commerce. One terminal of cell 28 is connected through the bulb and casing 26 to base 22, and the other terminal is connected with a contact member 34 in the form of spring wire extending through an insulator 36 enclosed in the hollow base member and through a small aperture 38 in the closed end of the base member opposite the casing 26. The spring wire 34 projects beyond the base member and at its end is preferably provided with a knob 40 of insulating material to avoid short circuiting of the device through the piston and cylinder of the engine. The base member and the wire 34 together constitute a switch for the flashlight.

When the spark plug apertures are disposed at an angle to the longitudinal center line of the cylinder, as the apertures 16 and 18 of Fig. 1, the wire 34 may be substantially straight so that the exact angular position of the indicator in the spark plug aperture is not material. The indicator is adjusted for any particular cylinder and piston combination by inserting it into the spark plug aperture and turning the crankshaft past the dead center position of the particular piston. If the light does not flash, the instrument is screwed further into the aperture until the light comes on for a brief interval as the piston reaches and passes its top dead center position. The set screw 42 is then screwed down until it contacts the cylinder surface, thus holding the instrument in position for operation.

In using the device after it has been adjusted, the crankshaft is turned to move the piston upwardly, to first make contact with knob 40, and then move the knob until wire 34 touches the edge of aperture 38, thus completing the circuit through the light bulb and the cell 28 causing the bulb to be illuminated. Further rotation of the crankshaft will carry the piston past the dead center and move the piston downwardly until contact by the wire is broken and the light goes out. A pointer or indicator secured to the crankshaft moves with reference to a fixed disc or the like. The position of the pointer is marked when the light goes on and again when the light goes out. Then if the pointer is turned to a point midway between those marks, the piston is on dead center. The crankshaft may thus be turned the requisite number of degrees away from this dead center position for adjusting the ignition and valve gearing to desired operating conditions.

Figure 2:
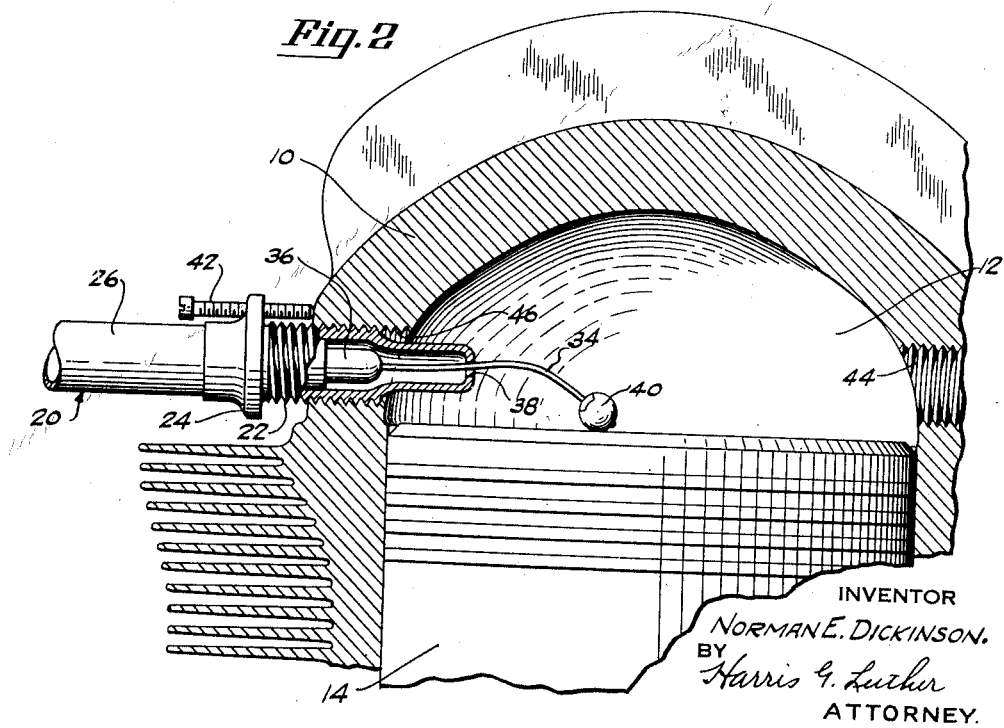
Fig. 2 is a view similar to Fig. 1 showing the instrument adapted for a slightly different form of engine cylinder from that illustrated in Fig. 1.

In the arrangement shown in Fig. 2 the cylinder is provided with spark plug apertures 44 and 46 which are substantially at right angles to the longitudinal center line of the cylinder and relatively close to the top dead center position of the head of the piston 14. In this case the same indicator is used but the wire 34 is slightly curved or bent in order to cause the top surface of the piston to come in contact with knob 40 slightly before the piston reaches its top dead center position. By bending the wire member 34 and adjusting the indicator, as described above, the indicator may be adapted to various forms of cylinder and piston arrangement. If the wire is bent away from the screw 42, as illustrated, the screw may be utilized to indicate the correct rotatorial position of the instrument in the spark plug aperture.

While the diameter of the base 22 and the exterior threads on this base are formed to fit a particular spark plug aperture, it is apparent that the base may be dimensioned and threaded to any desired spark aperture and, if desired, additional bases may be supplied with each indicator to adapt the indicator to a selected range of different spark plug diameters and spark plug threads.

While a suitable mechanical embodiment has been hereinabove described and illustrated in the accompanying drawing for the purpose of disclosing the invention, it is to be understood that the invention is not limited to the particular embodiment so illustrtaed and described but that such changes in the size, shape and arrangement of the various parts may be resorted to as come within the scope of the sub-joined claims.

Having now described the invention so that others skilled in the art may clearly understand the same, what it is desired to secure by Letters Patent is as follows:

1. An indicator for determining the position of a piston in an engine cylinder comprising, a base member having means thereon for securing said member in a spark plug aperture of an engine cylinder, an indicating device including an electric lamp, a contact finger extending inwardly from said base member and being arranged to be moved by the engine piston when said indicator is secured in an engine spark plug aperture, and means including said finger for making and breaking an electrical circuit through said lamp in response to movements of said finger.

2. A flashlight having a current controlling switch comprising a hollow member secured to one end of said flashlight and having means for mounting the latter in an aperture in a machine element, means for connecting said member to one end of the light circuit, a contact wire extending through said hollow member and out of an aperture therein, said contact wire being connected to the opposite end of said light circuit and insulated from said hollow member and normally spaced from said member at said aperture and operative to close said light circuit when brought into contact with said hollow member at said aperture, and a knob of insulating material on the free end of said contact wire.

3. A flashlight having a current controlling switch comprising a hollow member secured to one end of said flashlight and connected to one end of the light circuit, a contact wire extending through said hollow member and out of an aperture therein, said contact wire being connected to the opposite end of said light circuit and insulated from said hollow member and operative to close said light circuit when brought into contact with said hollow member at said aperture, and external screw threads on said hollow member dimensioned to engage in the thread in an engine spark plug aperture.

4. A flashlight having a current controlling switch comprising a hollow member secured to one end of said flashlight and connected to one end of the light circuit, a contact wire extending through said hollow member and out of an aperture therein, said contact wire being connected to the opposite end of said light circuit and insulated from said hollow member and operative to close said light circuit when brought into contact with said hollow member at said aperture, external screw threads on said hollow member dimensioned to engage the threads in an engine spark plug aperture, and a set screw carried by said base member at one side thereof to limit the projection of said member into a spark plug aperture.

5. An indicator for determining a selected position of a movable machine element comprising, a base member insertable in a machine aperture, a casing carried by said base member, an electric cell and lamp bulb carried by said casing, and a contact wire insulated from said base member and projecting through an aperture in said base member movable by said movable machine element to contact said base member at said aperture and complete an electric circuit through said lamp bulb and said electric cell.

6. An indicator for determining the position of a piston in an engine cylinder comprising, a base member having means thereon for securing said member in a spark plug aperture of an engine cylinder, an indicating device including an electric lamp carried by said base member, a contact finger extending inwardly from said base member and being arranged to be moved by the engine piston when said indicator is secured in an engine spark plug aperture, and means including said finger for making and breaking an electrical circuit through said lamp in response to movements of said finger.

NORMAN E. DICKINSON.